(12) United States Patent
Nitschke et al.

(10) Patent No.: US 7,734,431 B2
(45) Date of Patent: Jun. 8, 2010

(54) METHOD AND APPARATUS FOR FLUID LEAK DETECTION

(76) Inventors: Simon John Nitschke, 23 Lindeman Avenue, Buderim, Queensland (AU) 4556; Christopher John Bleecker Crowe, 78 Goddard Street, Lathlain, West Australia (AU) 6100

( * ) Notice: Subject to any disclaimer, the term of this patent is extended or adjusted under 35 U.S.C. 154(b) by 197 days.

(21) Appl. No.: 11/939,140

(22) Filed: Nov. 13, 2007

(65) Prior Publication Data
US 2008/0133152 A1 Jun. 5, 2008

Related U.S. Application Data

(60) Provisional application No. 60/867,963, filed on Nov. 30, 2006.

(51) Int. Cl.
G01F 17/00 (2006.01)
G01F 1/84 (2006.01)

(52) U.S. Cl. .................... 702/51; 73/861.355
(58) Field of Classification Search .......... 702/51, 702/53–57, 33–35, 38, 44–45, 47, 49–50, 702/65, 81, 84, 127, 130–131, 133–134, 702/138–140, 155, 158, 182–185, 189; 73/1.73, 73/1.82, 1.83, 40, 40.5 R, 592, 861.18, 861.19, 73/861.351, 861.354, 861.355; 374/4, 100–101, 374/163

See application file for complete search history.

(56) References Cited

U.S. PATENT DOCUMENTS

| | | | | | |
|---|---|---|---|---|---|
| 4,090,179 | A | * | 5/1978 | Hirano ........................ | 340/605 |
| 4,444,059 | A | * | 4/1984 | Smith ...................... | 73/861.357 |
| 4,491,025 | A | * | 1/1985 | Smith et al. ............ | 73/861.355 |
| 4,559,833 | A | * | 12/1985 | Sipin ...................... | 73/861.355 |
| 4,680,974 | A | * | 7/1987 | Simonsen et al. ...... | 73/861.357 |
| 4,703,660 | A | * | 11/1987 | Brenneman ............ | 73/861.357 |
| 4,763,530 | A | * | 8/1988 | Mizerak ................ | 73/861.357 |
| 5,083,451 | A |  | 1/1992 | Kling | |
| 5,230,254 | A | * | 7/1993 | Craft ..................... | 73/861.355 |
| 5,394,758 | A | * | 3/1995 | Wenger et al. ......... | 73/861.355 |

(Continued)

OTHER PUBLICATIONS

Viswanathan et al., Design and Development of Thermal Mass Flowmeters for High Pressure Applications, 2002, Flow Measurement and Instrumentation 13, pp. 95-102.*

(Continued)

*Primary Examiner*—Michael P. Nghiem
*Assistant Examiner*—Toan M Le
(74) *Attorney, Agent, or Firm*—Katten Muchin Rosenman LLP

(57) ABSTRACT

Certain embodiments of the invention relate to an apparatus for fluid leak detection. The apparatus includes a fluid supply conduit for supplying fluid to an external structure and a substantially parallel fluid return conduit for carrying fluid away from the external structure. The apparatus further includes: an oscillator for causing a separation of the fluid supply conduit and fluid return conduit to vary over time; sensors disposed relative to the conduits to measure the separation at respective opposed portions of the conduits; and a processor coupled to the oscillator and the sensors. The oscillator is responsive to the processor and receives respective separation measurement signals from the sensors. The processor is configured to determine whether there is a difference between a supply fluid mass flowing in the fluid supply conduit and a return fluid mass flowing in the fluid return conduit based on the separation measurement signals.

26 Claims, 4 Drawing Sheets

U.S. PATENT DOCUMENTS

| | | | |
|---|---|---|---|
| 5,416,724 A * | 5/1995 | Savic | 702/51 |
| 5,700,958 A * | 12/1997 | Lew et al. | 73/861.357 |
| 6,092,429 A | 7/2000 | Cunningham et al. | |
| 6,487,507 B1 * | 11/2002 | Mansfield et al. | 702/45 |
| 6,981,424 B2 * | 1/2006 | Henry et al. | 73/861.356 |
| 2005/0252307 A1 | 11/2005 | Andresen et al. | |

OTHER PUBLICATIONS

International Search Report for International Application No. PCT/CA2007/002024.

* cited by examiner

METHOD AND APPARATUS FOR FLUID LEAK DETECTION

CROSS-REFERENCE TO RELATED APPLICATIONS

This application claims the benefit of U.S. Provisional Patent Application Ser. No. 60/867,963, filed Nov. 30, 2006, the entire contents of which are hereby incorporated by reference.

TECHNICAL FIELD

The present invention relates generally to methods and apparatus for comparing the mass flow-rate of fluids in two separate conduits. In particular, embodiments relate to fluid leak detection using a modified form of coriolis flow meter.

BACKGROUND

Fluid leak detection of cooling fluid in the metallurgical industry has been attempted using various techniques. One technique involves using a pair of accurate magnetic flow meters installed on the inlet and outlet of the most critical cooling circuits. This technique not only represents significant capital expense, limiting its installation to the most sensitive cooling circuits rather than a furnace wide system, it also requires regular calibration to ensure that the instrument pair reports flow discrepancies accurately.

The coriolis flow meter is one of the most accurate flow meters in industrial use today and is also one of the few flow meters that measure mass flow directly, without requiring a density correction. Furthermore, the signal is directly proportional to the flow rate, unlike many alternative measurement techniques, such as those employing an orifice plate.

When installed in its traditional configuration, the coriolis meter is capable of continuously and directly measuring the mass flow of liquid or gas through a pipe. In its most basic configuration, the flow meter consists of a u-tube through which the process fluid flows. When the tube is oscillated at a known frequency, driven by a piezoelectric or electromagnetic device, the motion of the moving fluid inside imparts an angular deflection, or twisting, of the u-tube outside of its normal geometrical plane. The coriolis force which causes the twist is directly proportional to the mass flow through the tube and hence measurement of the amount of twist allows direct determination of the mass flow rate by the instrument. Furthermore, the frequency of the tube deflection allows accurate calculation of the fluid density.

To increase the accuracy of the flow measurement, the typical industrial configuration uses a pair of parallel u-tubes, which are again oscillated at a known frequency. The process fluid flows through both tubes in the same direction and the coriolis force again causes the tubes to measurably twist; the instrument measures the angle of twist between the two sensor tubes as a phase difference between the output signals of the two electromagnetic pickups. The parallel pair tube design automatically eliminates some common-mode error sources compared to the previously discussed single tube design.

In using two separate flow meters to compare differences in flow between the supply and return conduits for the purposes of leak detection, perfect calibration of the two flow meters is required. Spurious detection of differences in flow may be caused by loss of calibration of one or both of the flow meters. Further, errors or loss of accuracy may be introduced by digitizing, comparison and calibration of the sensed measurements of each of the two flow meters.

The described embodiments attempt to address or ameliorate one or more disadvantages or shortcomings associated with existing techniques for fluid leak detection, or to at least provide a useful alternative thereto.

SUMMARY

Certain embodiments of the invention relate to an apparatus for fluid leak detection. The apparatus comprises a fluid supply conduit for supplying fluid to an external structure and a fluid return conduit for carrying fluid away form the external structure, wherein the fluid supply conduit and the fluid return conduit are disposed in parallel with each other. The apparatus further comprises: an oscillator for causing a separation of the fluid supply conduit and fluid return conduit to vary over time; first and second sensors disposed relative to the fluid supply conduit and fluid return conduit to measure the separation at respective first and second opposed portions of the fluid supply and return conduits; and a processor coupled to the oscillator and the first and second sensors.

The oscillator is responsive to the processor and the processor receives respective first and second separation measurement signals from the first and second sensors. The processor is configured to determine whether there is a difference between a supply fluid mass flowing in the fluid supply conduit and a return fluid mass flowing in the fluid return conduit based on the first and second separation measurement signals.

In some embodiments, the fluid in the fluid supply conduit and the fluid in the fluid return conduit may flow in the opposite direction.

The processor may be further configured to determine the existence of a fluid leak associated with the external structure based on the determination that there is a difference between the supply fluid mass and the return fluid mass.

The processor may be configured to determine that there is a difference between the supply fluid mass and the return fluid mass when the first and second separation measurement signals are different from each other. A temperature sensor may be associated with each of the fluid supply conduit and the fluid return conduit for measuring a temperature of the fluid in the fluid supply conduit and the fluid return conduit, respectively. The processor may be further configured to determine a magnitude of the fluid leak based on a magnitude of the difference between the first and second separation measurement signals. Each temperature sensor may be one of a resistive temperature device (RTD) and a thermocouple.

The apparatus may further comprise third and fourth sensors for measuring relative movement of one of the fluid supply conduit and the fluid return conduit, wherein the third and fourth sensors are positioned on opposite sides of the oscillator and are equally spaced from the oscillator. The processor may be further configured to determine an absolute fluid mass passing through the one conduit based on respective outputs of the third and fourth sensors and a measured temperature of fluid in the one conduit. The third and fourth sensors may be electromagnetic displacement sensors. Each of the third and fourth sensors may comprise a coil and a magnet relatively movable in close proximity to each other, wherein one of the coil and the magnet is coupled to the one conduit so that the third and fourth sensors independently measure relative movement of the one conduit based on the relative movement of the coil and magnet of the respective third and fourth sensors.

The apparatus may further comprise a housing, wherein the fluid supply and return conduits, the oscillator and the first and second sensors are disposed within the housing. The fluid supply and return conduits may comprise curved or bent segments. The first and second opposed portions may be spaced equally on either side of the oscillator. The first and second sensors may comprise electromagnetic sensors.

The apparatus may be comprised in a leak detection system or a cooling system, for example within a furnace system.

Other embodiments of the invention relate to a method for detecting a fluid leak associated with a system having a fluid supply conduit and a fluid return conduit disposed in parallel with each other. The method comprises causing a separation of the fluid supply conduit and the fluid return conduit to vary in an oscillating manner, measuring first and second separations at respective first and second opposed portions of the fluid supply and return conduits during flow of fluid in the fluid supply conduit in one direction and in the fluid return conduit in an opposite direction and determining whether there is a difference between a supply fluid mass flowing in the fluid supply conduit and a return fluid mass flowing in the fluid return conduit based on the measured first and second separations. The method may further comprise determining the existence of the fluid leak based on the determination that there is a difference between the supply fluid mass and the return fluid mass.

The determining may comprise determining that there is a difference between the supply fluid mass and the return fluid mass when the first and second separation measurement signals are different from each other. The method may further comprise measuring a temperature of fluid in each of the fluid supply conduit and the fluid return conduit. The method may further comprise determining a magnitude of the fluid leak based on a magnitude of the first and second separations and the measured temperatures. The method may further comprise measuring movement of one of the fluid supply conduit and the fluid return conduit relative to a fixed component of the system. The method may further comprise determining an absolute fluid mass passing through the one conduit based on the measured movement of the one conduit. The method may be performed automatically by a controller comprised in the system.

Other embodiments of the invention relate to an apparatus for differential mass flow measurement. The apparatus comprises a first fluid conduit, and a second fluid conduit disposed in parallel with the first fluid conduit. The apparatus further comprises an oscillator for causing a separation of the first fluid conduit and the second fluid conduit to vary over time. First and second sensors are disposed relative to the first fluid conduit and the second fluid conduit to measure the separation at respective first and second opposed portions of the first and second conduits. A processor is coupled to the oscillator and the first and second sensors, and is responsive to the processor. The processor receives respective first and second separation measurement signals from the first and second sensors, and is configured to determine whether there is a difference between a first fluid mass flowing in the first fluid conduit and a second fluid mass flowing in the second fluid conduit based on the first and second separation measurement signals.

Other embodiments of the invention relate to a method for detecting a difference in fluid mass flow associated with a system having a first fluid conduit and a second fluid conduit disposed in parallel with each other. The method comprises causing a separation of the first fluid conduit and the second fluid conduit to vary in an oscillating manner, measuring first and second separations at respective first and second opposed portions of the first and second fluid conduits during flow of the fluid in the first fluid conduit in a first direction and in the second fluid conduit in a second direction and determining whether there is a difference between a first fluid mass flowing in the first fluid conduit and a second fluid mass flowing in the second fluid conduit based on the measured first and second separations.

Further embodiments of the invention relate to computer readable storage storing program instructions which, when executed by a processor cause the processor to perform the methods described above.

BRIEF DESCRIPTION OF THE DRAWINGS

Embodiments are described in further detail below, by way of example, with reference to the accompanying drawings, in which.

DETAILED DESCRIPTION

Figure 1:
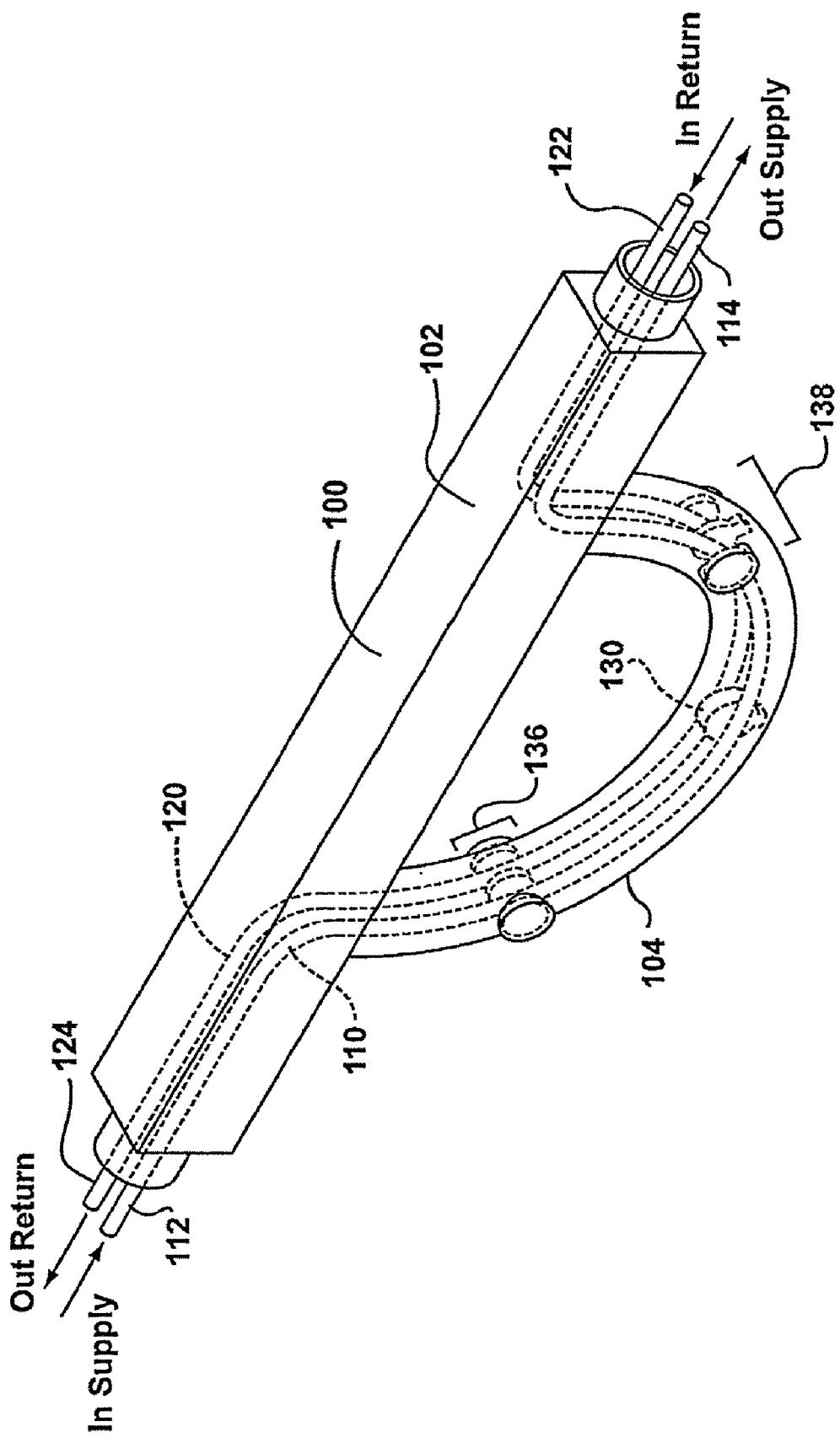
FIG. 1 is a schematic representation in perspective of a part of a fluid leak detection apparatus.

The described embodiments generally relate to methods, systems and apparatus for comparing fluid mass flow in two separate conduits. More specifically, some described embodiments relate to fluid leak detection where fluid is provided to an external structure and returned therefrom, and it is designed to detect leakage associated with the external structure by comparing the quantity of the returned fluid to the quantity of the supplied fluid.

The described embodiments may be useful in a number of different applications involving a variety of external structures and different fluids. One specific application for which the embodiments are suitable is the supply of liquid coolant to components of a metallurgical furnace. For example, coolant may be supplied to copper cooling elements on the furnace wall or to a tap block that taps molten process material from the metallurgical furnace. In such cases, leakage of coolant, which may be water, in or around such furnace components may constitute a substantial safety hazard and/or affect the operation of the components of the furnace.

For purposes of illustration, embodiments are described herein with reference to their application to fluid leak detection, as well as fluid mass and temperature measurement, in a system that supplies fluid coolant to cooling elements in a metallurgical furnace system. It should be noted that the destination or path of the fluid within a particular structure does not affect the functioning of the embodiments.

The described embodiments may be useful in any situation in which it is desired to compare the mass flow of fluids in two separate conduits. For example, embodiments may be used in situations where it is desired to add equal masses of two fluids to a reactor vessel, in order to ascertain whether the right proportions of the fluids are being provided to the vessel. In such embodiments, if the two fluids do not have equal density and flow rate, the flow rate of each supply conduit may be controlled by a flow control device (not shown) to compensate for differences in density between the two fluids.

Although some described embodiments reference a "fluid supply conduit" and a "fluid return conduit" in the context of supplying fluid to and returning fluid from an external structure, some embodiments may comprise conduits which do not supply and return fluid to the same structure. In such embodiments, the conduits may be referred to as "first" and "second" fluid conduits.

As an alternative to installing a pair of supply and return flow meters to monitor for leaks on cooling circuits, the described embodiments can employ a single leak detection meter, for example through the reconfiguration of the flow paths within a coriolis flow meter. The supply fluid, which may be water, flows through one of the tubes, and the return fluid of the same circuit flows back through the second parallel tube in the opposite direction, as indicated in FIG. 1.

The first (supply) fluid conduit and the second (return) fluid conduit should be parallel along a length where both conduits are deflectable. However, deviations from parallel may be operable. If the conduits do deviate from parallel, further calibration of the device may be required. Therefore, the term "parallel" is intended to include parallel and deviations from parallel that still allow functioning of the device, with or without calibration.

FIG. 1 shows an embodiment of a housing 100 of a leak detection apparatus 205 (FIG. 2) in perspective. The housing 100 has a fluid supply conduit 110 and a fluid return conduit 120 passing therethrough. Housing 100 comprises a hollow tubular loop 104 in an approximate U-shape extending away from a longitudinally extending hollow barrel portion 102 of housing 100. Although loop 104 is shown in FIG. 1 to be U-shaped, other symmetrical loop shapes may be employed to similar effect. Further, not all coriolis flow meters require the use of a loop and the principles of operation of such coriolis flow meters may be applied in the context of the described embodiments for leak detection purposes as described herein.

Fluid supply and return conduits 110, 120 may extend through loop portion 104 and through end parts of barrel portion 102. Under 'no leak' flow conditions, the coriolis twisting forces through the supply and return conduits 110, 120 will act in opposing directions relative to fluid flow direction, and effectively cancel out any relative angular motion between the tubes. The detection of any difference in angle of twist between the supply and return conduits 110, 120 indicates a differential flow in the supply and return conduits 110, 120 and hence that there is a leak in, or associated with, the external structure 215 (FIG. 2) to which the fluid is supplied.

Loop 104 comprises an oscillator 130. In the embodiments shown, oscillator 130 is located within loop 104 at its mid-point, for laterally oscillating fluid supply and return conduits 110, 120. Oscillator 130 causes fluid supply and return conduits 110, 120 to repeatedly move in substantially opposite directions (i.e. away from each other and towards each other). During flow of fluid through supply and return conduits 110, 120, the inertia of the fluid will cause angular deflection of the supply and return conduits 110, 120 as they are caused to oscillate by oscillator 130.

In order to detect the angular deflection of the fluid supply and return conduits 110, 120 while fluid flows therein, first and second displacement sensors 136, 138 are positioned at locations on portions of loop 104. First and second displacement sensors 136, 138, may be located so as to be equally spaced on opposite sides of oscillator 130. In some embodiments, first and second displacement sensors 136, 138 may be electromagnetic sensors, for example including an electric coil and magnet movable relative to each other, as is known in the art.

The arrangement of oscillator 130 and first and second displacement sensors 136, 138 within loop 104 may be similar to the arrangement of sensors in existing coriolis flow meters that employ parallel conduits in a loop (or non-loop) configuration, or may have an alternate arrangement that allows first and second displacement sensors to detect the relative angular deflection of the fluid supply and return conduits. One example of a commercially available coriolis flow meter is the RotaMASS 3-series coriolis flow meter available from Yokogawa Corporation of America.

Devices like the RotaMASS 3-series coriolis flow meter are intended to only have a single inlet and a single outlet for a single fluid stream flowing in one direction. Within the flow meter, the single fluid stream is divided into two separate and parallel fluid streams running in the same direction. In contrast, the apparatus 205 of the described embodiments operates by having two fluid paths flow therethrough that are distinct and independent from each other and that have fluid flowing in opposite but parallel directions. Thus, as illustrated in FIG. 1, each longitudinal end of barrel portion 102 has an opening through which an inlet or outlet of the supply and return conduits 110, 120 pass. In the example illustrated in FIG. 1, supply conduit 110 has a supply inlet 112 on the left hand side of housing 100 and a supply outlet 114 on an opposite (right) side of housing 100. Correspondingly, return conduit 120 has a return inlet 122 on the right side of housing 100 and a return outlet 124 on an opposite (left) side of housing 100.

Figure 2:
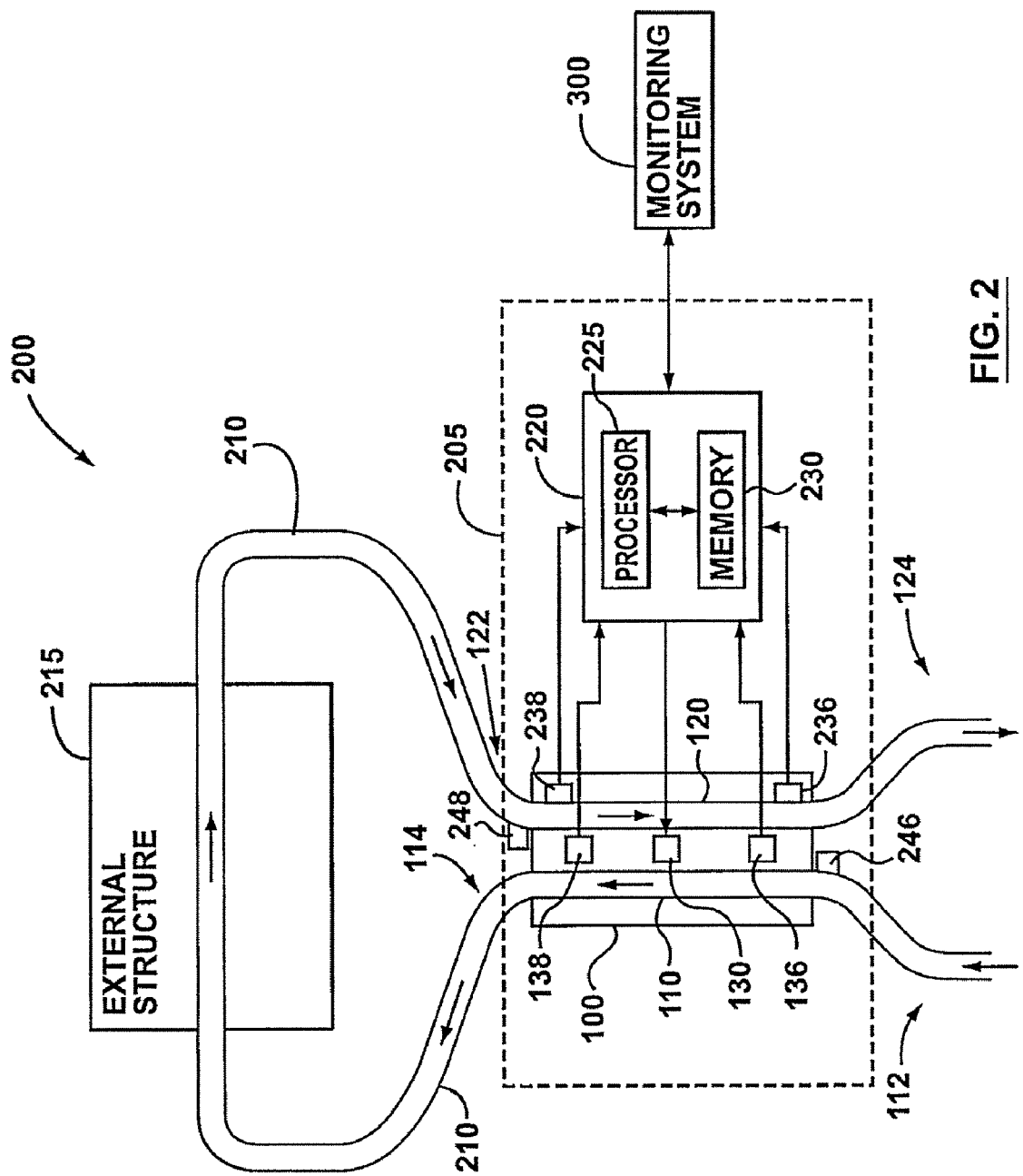
FIG. 2 is a schematic representation of a system employing a fluid leak detection apparatus.

Referring in particular to FIG. 2, a leak detection system 200 will now be described in further detail. Although system 200 is described as a leak detection system, it also includes instrumentation for mass flow measurement and temperature measurement and thus is not solely concerned with leak detection. Generally, system 200 may be used in situations requiring the comparison of fluid mass flow rates in two separate conduits.

Leak detection system 200 comprises apparatus 205 for use in fluid leak detection through which part of a fluid circuit 210 passes. Portions of both the supply path and return path of fluid circuit 210 pass through housing 100 within apparatus 205. Parts of fluid circuit 210 passing through housing 100 include the fluid supply conduit 110 and fluid return conduit 120. Fluid circuit 210 may also pass through an external structure 215, for example, a cooling element associated with a furnace. External structure 215 may have a variety of forms and functions that require fluid to pass therethrough and for which it is relevant to measure a difference in fluid mass supplied to the external structure 215 and the fluid mass returned therefrom.

In some embodiments, apparatus 205 may comprise the housing 100 and components thereof shown in FIG. 1, as well as additional sensors and components. For example, apparatus 205 may comprise a controller 220 having a processor 225 and a memory 230 accessible to the processor 225. Controller 220 need not be co-located with housing 100 and may be coupled thereto by a shielded cable.

Controller 220 provides an appropriate signal to oscillator 130 to cause it to operate and vary the separation of supply and return conduits 110, 120 over time. Controller 220 may further receive measurements from first and second displacement sensors 136, 138 indicative of the separation of the supply and return conduits 110, 120. Any difference in the separation of the supply and return conduits 110, 120 sensed at the different locations of first and second displacement sensors 136, 138 is indicative of a relative angular (non-parallel) movement of supply and return conduits 110, 120 that implies that the mass of the fluid in return conduit 120 is not the same as the mass of the fluid in supply conduit 110.

Where there is no leakage from fluid circuit 210, it is expected that the fluid mass passing through return conduit 120 is the same as that passing through supply conduit 110. Accordingly, such a circumstance would result in the separation of supply and return conduits 110, 120 being measured by first and second displacement sensors 136, 138 to be the same at any given time (although the magnitude of separation measured by first and second displacement sensors 136, 138 varies over time under the action of oscillator 130).

Although some described embodiments refer to conduits in which fluid flows in opposite directions, it is possible that the apparatus may be configured such that the fluid in each conduit flows in the same direction. In such embodiments, rather than measuring the separation of the conduits at two points to determine if the separation at each point is substantially the same, the apparatus may measure the separation of the conduits at two points to determine if the oscillation of the two conduits is substantially out of phase.

Apparatus 205 may further comprise at least one temperature sensor. For example, apparatus 205 may comprise first and second temperature sensors 246, 248 positioned to sense the temperature of the fluid in supply conduit 110 and return conduit 120, respectively. Temperature sensors 246, 248 may be Resistive Temperature Devices (RTDs), thermistors, thermometers, or thermocouples, for example. The measurements made by one or both of temperature sensors 246, 248 may be used to perform the known mass flow calculations to determine the magnitude of the fluid leak and the absolute fluid flow through one or both conduits.

As shown in FIG. 2, first and second temperature sensors 246, 248 may be disposed adjacent the supply inlet 112 and the return inlet 122. This may balance any effect such sensors may have on fluid flow in supply and return conduits 110, 120 through loop 104. Alternatively, in other embodiments, first and second temperature sensors 246, 248 may be positioned adjacent the supply outlet 114 and return outlet 124, respectively. In other embodiments, first and second temperature sensors 246, 248 may be positioned elsewhere with respect to the supply outlet 114 and return outlet 124.

In order to measure the absolute fluid mass passing through fluid circuit 210, housing 100 may also have third and fourth displacement sensors 236, 238. In some embodiments, third and fourth displacement sensors 236, 238 may be positioned relative to either the return conduit 120, as shown in FIG. 2, or the supply conduit 110 (not shown). In some embodiments, third and fourth displacement sensors 236, 238 may be electromagnetic displacement sensors employing a coil and magnet in a similar manner to first and second displacement sensors 136, 138. Thus, third and fourth displacement sensors 236, 238 may have a magnet fixed relative to the housing 100 adjacent a coil fixed to the return conduit 120 or vice versa.

In the embodiment illustrated in FIG. 2, third and fourth displacement sensors 236, 238 and temperature sensor 248 effectively enable controller 220 to measure fluid mass through the return conduit 120 in a manner similar to a conventional coriolis mass flow meter by measuring angular deflection in the conduit caused by the inertia of fluid flowing through the conduit as that conduit is moved by an oscillator, such as oscillator 130. Embodiments are also contemplated in which absolute mass flow sensors are provided on both supply and return conduits or on neither.

Controller 220 receives measurement signals from first and second temperature sensors 246, 248, as well as measurements of relative movement from first, second, third and fourth displacement sensors 136, 138, 236, 238. Controller 220 may comprise suitable analog to digital conversion circuitry and/or digital to analog conversion circuitry for interfacing with the instrumentation in apparatus 205, as required.

Processor 225 performs the functions of receiving and processing measurement signals from the sensors and setting the frequency at which oscillator 130 is to oscillate. Processor 225 may run on stored program control, executing program instructions stored in memory 230. Memory 230 may also be used to store data, such as measurement, calibration or configuration data, as necessary. Memory 230 may comprise non-volatile and/or volatile storage components.

Figure 3:
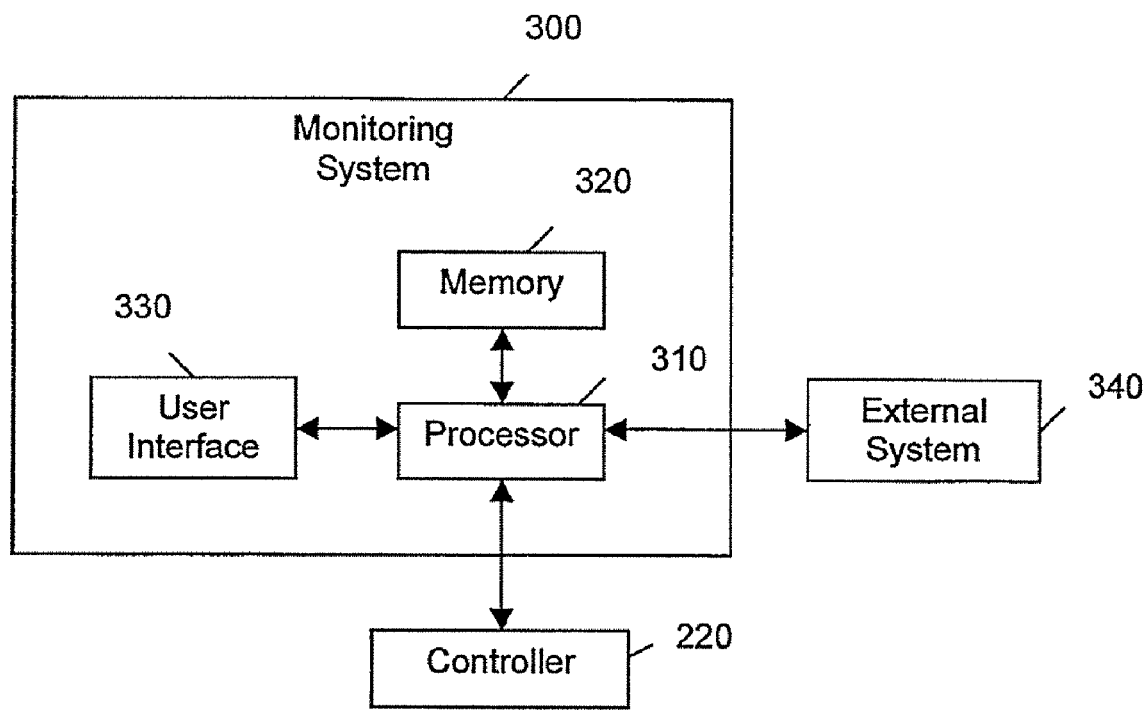
FIG. 3 is a block diagram of a monitoring system for use with the fluid leak detection apparatus.

Referring also to FIG. 3, in some embodiments apparatus 205 may communicate with a monitoring system 300. Monitoring system 300 may be part of a control system for the industrial/commercial facility in which the external structure 215 is located. For example, monitoring system 300 may be (or be part of) a computerized control or monitoring system accessible to plant personnel for enabling the operational status of various equipment and structures in the facility to be monitored and controlled. Alternatively, monitoring system 300 may comprise a personal computer (PC) in communication with controller 220 of apparatus 205. In a further alternative, monitoring system 300 may be integrated with apparatus 205.

Monitoring system 300 may communicate with controller 220 via a dedicated communication line, via a bus connection or over a network, for example. The network may be a local area network (LAN) and may be wired or wireless.

Monitoring system 300 may comprise a processor 310, a memory 320 accessible to the processor 310 and a user interface 330. User interface 330 may be responsive to processor 310 to provide a display to a user indicative of the measurements and determinations made by apparatus 205. Further, user interface 330 may be employed by a user to input commands to monitoring system 300 for processing by processor 310.

While controller 220 may optionally be configured to provide user interface functions, such as status display functions, it is intended that the user interface functions be primarily provided by monitoring system 300 through user interface 330. Thus, for example, if plant operating personnel wish to modify the frequency at which oscillator 130 oscillates, this can be done through entering a command into user interface 330, which is processed by processor 310 into a command recognizable by controller 220, which in turn causes processor 225 to transmit an appropriate signal to oscillator 130 to set or modify the oscillation frequency.

Monitoring system 300 may also communicate to an external system 340. The external system 340 may be another automated system within the facility, such as a control system for external structure 215. In the example where external structure 215 is a furnace cooling element, external system 340 may be a control system for controlling operational aspects of the furnace where the cooling element is located. This may be important where, for example, apparatus 205 detects a fluid leak from fluid circuit 210 and it becomes desirable to automatically modify (i.e. shut down) the control of the furnace, pending further investigation of the source of the fluid leak.

Figure 4:
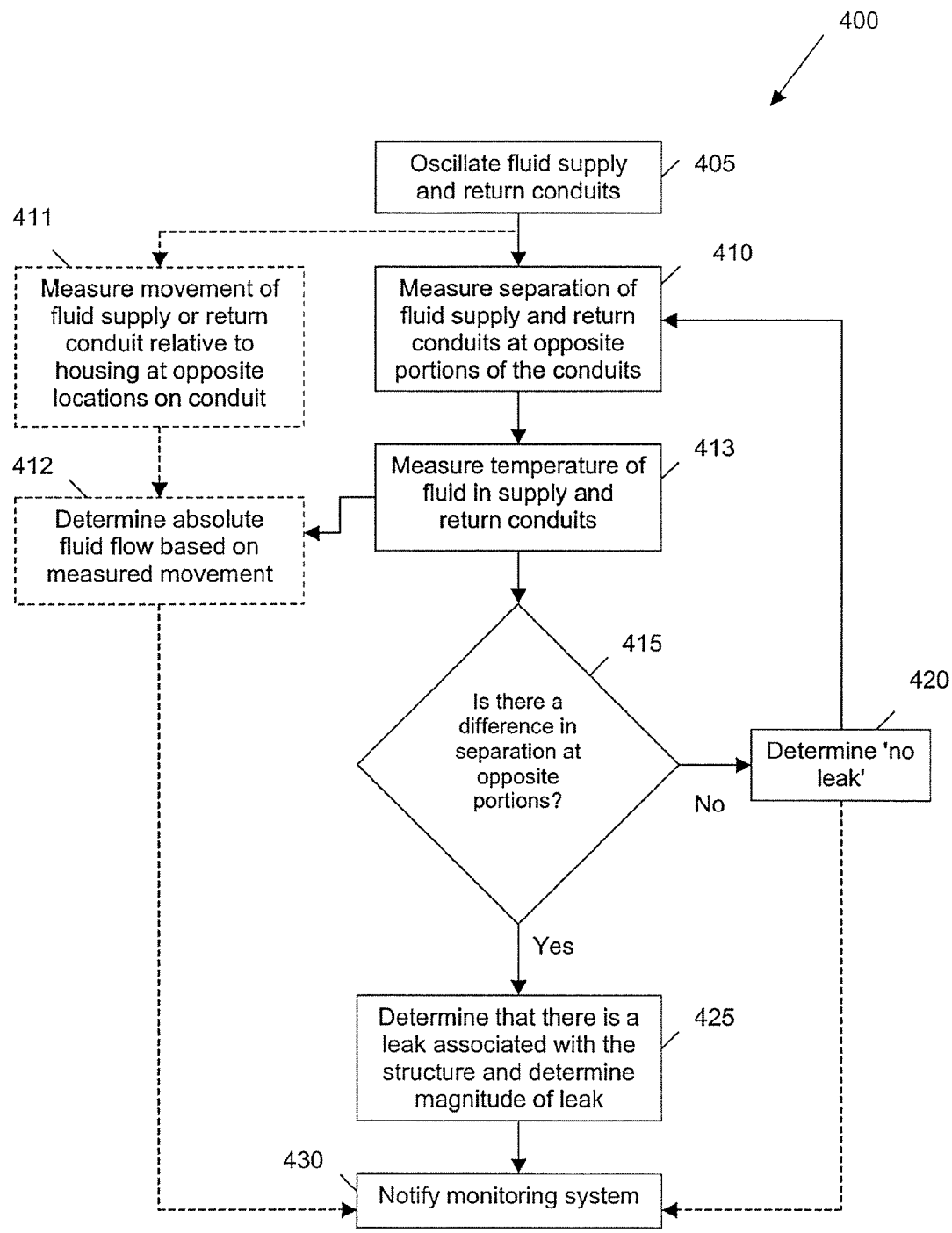
FIG. 4 is a flowchart of a fluid leak detection method.

Referring now to FIG. 4, there is shown a flowchart of an embodiment of a method 400 of fluid leak detection. Method 400 begins at step 405, at which fluid supply and return conduits 110, 120 are caused to oscillate by oscillator 130 at a frequency set by controller 220.

At step 410, the separation of the fluid supply and return conduits 110, 120 is measured by first and second displacement sensors 136, 138 positioned at opposite portions of the supply and return conduits 110, 120. First and second displacement sensors 136, 138 are equally spaced from oscillator 130 on either side along a longitudinal direction of the housing 100. First and second displacement sensors 136, 138 transmit measurement signals to controller 220, indicative of the relative separation of the supply and return conduits 110, 120 at the positions in loop 104 at which the first and second displacement sensors 136, 138 are located.

At step 413, controller 220 receives the output of first and second temperature sensors 246, 248 as a measurement of the temperature flowing through the supply and return conduits 110, 120 and can provide the sensed temperatures as an output to either the user interface 330 or external system 340.

At step 415, controller 220 processes the measurement signals from first and second displacement sensors 136, 138 to determine whether there is a difference in separation (specifically a phase difference) indicated by the first and second displacement sensors 136, 138 at the opposite portions of the supply and return conduits 110, 120. This determination is made by processor 225 based on program instructions stored in memory 230, according to known coriolis flow calculation techniques. If, at step 415, it is determined by processor 225 that first and second displacement sensors 136, 138 do not indicate a difference in separation, processor 225 determines at step 420 that there is a "no leak" condition. On the other hand, if first and second sensors 136, 138 do indicate that there is a difference in separation, it is determined by processor 225 at step 425 that there is a leak associated with the external structure 215. Further, processor 225 is configured to approximately determine at step 425 the magnitude of the fluid leak based on the magnitude of the (phase) difference in separation between the supply and return conduits 110, 120 at the opposite portions and the fluid temperatures measured by temperature sensors 246, 248.

At step 430, controller 220 communicates with monitoring system 300 to notify monitoring system 300 of the detected leak, as well as the approximate magnitude of the leak. Monitoring system 300 may also be notified at step 430 following the "no leak" determination at step 420. Optionally, controller 220 may be configured to only notify monitoring system 300 at step 430 upon detection of a fluid leak.

Depending on whether the third and fourth displacement sensors 236, 238 are employed within housing 100, steps 411 and 412 may be performed. If third and fourth displacement sensors 236, 238 are employed, then at step 411, these sensors are used to measure the movement of the fluid supply or return conduit 110 or 120 relative to the housing 100 at opposite locations on the relevant conduit.

In an alternative embodiment of apparatus 205, sensors similar to third and fourth displacement sensors 236, 238 may be employed on both the supply and return conduits 110, 120 to measure absolute mass flow through each such conduit. In such an embodiment, controller 220 may receive the movement measurement outputs of third and fourth displacement sensors 236, 238 (and additional movement measurement sensors, if they exist) and measurement outputs from temperature sensor 248 (and 246 if additional displacement sensors are used) and may use known coriolis equations to determine the absolute mass flow through one or both conduits.

At step 412, processor 225 processes the outputs of third and fourth displacement sensors 236, 238 and uses the temperature measured at step 413 to determine the absolute fluid flow through the conduit with which the third and fourth displacement sensors 236, 238 are associated. Processor 225 makes such a determination by performing calculations that correspond the measured relative deflection of the conduit with mass flow through the conduit.

If steps 411 and 412 were performed, then controller 220 notifies monitoring system 300 of the measured absolute fluid flow at step 430. Performance of steps 411 and 412 is dependent on performance of step 413 as calculation of the absolute mass flow requires the temperature of the fluid to be known.

Method 400 may be performed continuously during operation of leak detection system 200. Thus, steps 405 to 430 may be performed continuously to detect a possible fluid leak in fluid circuit 210 and optionally to obtain absolute fluid flow and temperature measurements pertaining to fluid circuit 210.

The described embodiments may allow accurate and continuous leak monitoring of fluid circuits using a single instrument requiring little or no regular maintenance or calibration. Furthermore, in embodiments comprising third and fourth electromagnetic displacement sensors 236, 238 fixed to the housing 100, the apparatus 205 may also measure the absolute mass flow through the cooling circuit 210. Measuring of the absolute mass flow provides valuable information for flow balancing and heat flux surveys of the furnace area and may obviate the flow switches and meters that are typically used to monitor and confirm flow with furnace cooling circuits.

While the above description provides examples of embodiments, it will be appreciated that some features and/or functions of the described elements are susceptible to modification without departing from the spirit and principles of operation of the described embodiments. Accordingly, what has been described is intended to be illustrative of the invention and non-limiting.

The invention claimed is:

1. An apparatus for fluid leak detection, comprising:
a fluid supply conduit for supplying fluid to an external structure;
a fluid return conduit for carrying fluid away from the external structure, wherein the fluid supply conduit and the fluid return conduit are disposed substantially in parallel with each other;
an oscillator for causing a separation of the fluid supply conduit and fluid return conduit to vary over time;
first and second sensors disposed relative to the fluid supply conduit and fluid return conduit to measure the separation at respective first and second opposed portions of the fluid supply and return conduits; and
a processor coupled to the oscillator and the first and second sensors, wherein the oscillator is responsive to the processor and the processor receives respective first and second separation measurement signals from the first and second sensors, and wherein the processor is configured to determine whether there is a difference between a supply fluid mass flowing in the fluid supply conduit and a return fluid mass flowing in the fluid return conduit based on the first and second separation measurement signals, and output a signal based on the determination, said output signal corresponding to a fluid leak.

2. The apparatus of claim 1, wherein the processor is further configured to determine the existence of a fluid leak associated with the external structure based on the determination that there is a difference between the supply fluid mass and the return fluid mass.

3. The apparatus of claim 2, wherein the processor is configured to determine that there is a difference between the supply fluid mass and the return fluid mass when the first and second separation measurement signals are different from each other.

4. The apparatus of claim 1, further comprising a temperature sensor associated with each of the fluid supply conduit and the fluid return conduit for measuring a temperature of the fluid in the fluid supply conduit and the fluid return conduit, respectively.

5. The apparatus of claim 4, wherein the processor is further configured to determine a magnitude of the fluid leak based on a magnitude of the difference between the first and second separation measurement signals and the measures temperatures of the fluid in the fluid supply and return conduits.

6. The apparatus of claim 5, wherein each temperature sensor is one of a resistive temperature device (RTD) and a thermocouple.

7. The apparatus of claim 1, further comprising third and fourth sensors for measuring relative movement of one of the fluid supply conduit and the fluid return conduit, wherein the third and fourth sensors are positioned on opposite sides of the oscillator and are equally spaced from the oscillator.

8. The apparatus of claim 7, wherein the processor is further configured to determine an absolute fluid mass passing through the one conduit based on respective outputs of the third and fourth sensors and a measure temperature of fluid in the one conduit.

9. The apparatus of claim 8, wherein the third and fourth sensors are electromagnetic displacement sensors.

10. The apparatus of claim 9, wherein each of the third and fourth sensors comprises a coil and a magnet relatively movable in close proximity to each other, wherein one of the coil and magnet is coupled to the one conduit so that the third and fourth sensors independently measure relative movement of the one conduit based on the relative movement of the coil and magnet of the respective third and fourth sensors.

11. The apparatus of claim 1, further comprising a housing, wherein the fluid supply and return conduits, the oscillator and the first and second sensors are disposed within the housing.

12. The apparatus of claim 1, wherein the fluid supply and return conduits comprise curved or bent segments.

13. The apparatus of claim 1, wherein the first and second opposed portions are spaced equally on either side of the oscillator.

14. The apparatus of claim 1, wherein the first and second sensors comprise electromagnetic sensors.

15. The apparatus of claim 1, wherein the fluid of the fluid supply conduit and the fluid of the fluid return conduit flow in substantially opposite directions.

16. A method for detecting a fluid leak associated with a system having a fluid supply conduit and a fluid return conduit disposed substantially in parallel with each other, the method comprising using a controller comprised in the system for automatically:
  causing a separation of the fluid supply conduit and the fluid return conduit to vary in an oscillating manner;
  measuring first and second separations at respective first and second opposed portions of the fluid supply and return conduits during flow of fluid in the fluid supply conduit in one direction and in the fluid return conduit in an opposite direction;
  determining whether there is a difference between a supply fluid mass flowing in the fluid supply conduit and a return fluid mass flowing in the fluid return conduit based on the measured first and second separations; and
  sending a signal based on the determining, the sent signal corresponding to a fluid leak.

17. The method of claim 16, further comprising determining the existence of the fluid leak based on the determination that there is a difference between the supply fluid mass and the return fluid mass.

18. The method of claim 16, wherein the determining comprises determining that there is a difference between the supply fluid mass and the return fluid mass when the first and second separation measurement signals are different from each other.

19. The method of claim 16, further comprising measuring a temperature of fluid in each of the fluid supply conduit and the fluid return conduit.

20. The method of claim 19, further comprising determining a magnitude of the fluid leak based on a magnitude of the first and second separations and the measured temperatures.

21. The method of claim 19, further comprising measuring movement of one of the fluid supply conduit and the fluid return conduit relative to a fixed component of the system.

22. The method of claim 21, further comprising determining an absolute fluid mass passing through the one conduit based on the measured movement of the one conduit and the measured temperature of the fluid in the one conduit.

23. A computer readable storage storing program instructions which, when executed by a processor, cause the processor to perform a method for detecting a fluid leak associated with a system having a fluid supply conduit and a fluid return conduit disposed substantially in parallel with each other, the method comprising:
  causing a separation of the fluid supply conduit and the fluid return conduit to vary in an oscillating manner;
  measuring first and second separations at respective first and second opposed portions of the fluid supply and return conduits during flow of fluid in the fluid supply conduit in one direction and in the fluid return conduit in an opposite direction;
  determining whether there is a difference between a supply fluid mass flowing in the fluid supply conduit and a return fluid mass flowing in the fluid return conduit based on the measured first and second separations; and
  sending a signal based on the determining, the sent signal corresponding to a fluid leak.

24. An apparatus for differential fluid flow measurement, comprising:
  a first fluid conduit;
  a second fluid conduit disposed substantially in parallel with the first fluid conduit;
  an oscillator for causing a separation of the first fluid conduit and the second fluid conduit to vary over time;
  first and second sensors disposed relative to the first fluid conduit and the second fluid conduit to measure the separation at respective first and second opposed portions of the first and second conduits; and
  a processor coupled to the oscillator and the first and second sensors, wherein the oscillator is responsive to the processor and the processor receives respective first and second separation measurement signals from the first and second sensors, and wherein the processor is configured to determine whether there is a difference between a first fluid mass flowing in the first fluid conduit and a second fluid mass flowing in the second fluid conduit based on the first and second separation measurement signals, and output a signal based on the determination.

25. A method for detecting a difference in fluid mass flow associated with a system having a first fluid conduit and a second fluid conduit disposed substantially in parallel with each other, the method comprising using a controller comprised in the system for automatically:
  causing a separation of the first fluid conduit and the second fluid conduit to vary in an oscillating manner;
  measuring first and second separations at respective first and second opposed portions of the first and second fluid conduits during flow of fluid in the first fluid conduit in a first direction and in the second fluid conduit in a second direction;
  determining whether there is a difference between a first fluid mass flowing in the first fluid conduit and a second fluid mass flowing in the second fluid conduit based on the measured first and second separations; and
  sending a signal based on the determining.

26. The method of claim 25, wherein the first direction and the second direction are opposite.

* * * * *